(12) United States Patent
He et al.

(10) Patent No.: US 12,222,629 B2
(45) Date of Patent: Feb. 11, 2025

(54) FOLLOW FOCUS

(71) Applicant: SHENZHEN NEEWER TECHNOLOGY CO. LTD, Shenzhen (CN)

(72) Inventors: Chao He, Shenzhen (CN); Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 207 days.

(21) Appl. No.: 17/977,163

(22) Filed: Oct. 31, 2022

(65) Prior Publication Data

US 2024/0126141 A1    Apr. 18, 2024

(30) Foreign Application Priority Data

Oct. 14, 2022   (CN) .......................... 202222730290.8

(51) Int. Cl.
  *G03B 13/32*   (2021.01)
  *F16H 55/22*   (2006.01)
  *F16H 57/02*   (2012.01)

(52) U.S. Cl.
  CPC ............. *G03B 13/32* (2013.01); *F16H 55/22* (2013.01); *F16H 2057/02039* (2013.01)

(58) Field of Classification Search
  CPC ................................ G03B 13/18; G03B 13/32
  See application file for complete search history.

(56) References Cited

U.S. PATENT DOCUMENTS

| | | | |
|---|---|---|---|
| 2017/0191377 A1* | 7/2017 | Longacre | F01D 25/164 |
| 2017/0212323 A1* | 7/2017 | Subratie | G02B 7/04 |
| 2018/0239387 A1* | 8/2018 | Liu | G05G 1/12 |
| 2021/0405506 A1* | 12/2021 | Olinger | G03B 17/56 |

\* cited by examiner

*Primary Examiner* — Noam Reisner
(74) *Attorney, Agent, or Firm* — Westbridge IP LLC

(57) ABSTRACT

Disclosed is a follow focus. The follow focus includes the gear box, the handwheel assembly and the follow focus assembly. The handwheel assembly includes a handwheel body and an active worm, the active worm is fixed to the handwheel body and extends toward the gear box, and the active worm is provided with a first worm gear; and a follow focus assembly includes a follow focus gear and a driven worm, the driven worm is fixed to the follow focus gear and extends toward the gear box, the driven worm is provided with a second worm gear, an angle between the active worm and the driven worm is 90°, and the first worm gear is meshed with the second worm gear.

11 Claims, 5 Drawing Sheets

FOLLOW FOCUS

CROSS-REFERENCE TO RELATED APPLICATIONS

This application claims priority to Chinese Patent Application 202222730290.8, filed on Oct. 14, 2022, the entire contents of which are incorporated herein by reference.

TECHNICAL FIELD

The present application relates to the technical field of the follow focus, and in particular to a follow focus.

BACKGROUND

In the field of photography, photographers when shooting video need to capture the image by turning the focus ring and the aperture of the lens. The follow focus is a more convenient and accurate control of the focus device.

Currently on the market, a rotation direction of the handwheel body is vertical to that of the follow focus gear, so there is a transmission structure in the middle thereof, the existing products adopts 45° bevel gear to rotate by 90°, but there is a transmission gap error about 1°-3° in the 45° bevel gear, this transmission gap is not even, so that the follow focus gear can not follow the handwheel body to rotate, which if serious will lead to the follow focus gear not follow the focus.

SUMMARY

The main purpose of the present application is to provide a follow focus, which aims to eliminate the transmission gap between the handwheel body and the follow focus gear, so that the follow focus gear follows the rotation of the handwheel body.

In order to achieve the above purpose, the follow focus provided by the present application, including:
  a gear box;
  a handwheel assembly including a handwheel body and an active worm, wherein the active worm is fixed to the handwheel body and extends toward the gear box, and the active worm is provided with a first worm gear; and
  a follow focus assembly including a follow focus gear and a driven worm, wherein the driven worm is fixed to the follow focus gear and extends toward the gear box, the driven worm is provided with a second worm gear, an angle between the active worm and the driven worm is 90°, and the first worm gear is meshed with the second worm gear.

In an embodiment, the active worm is further provided with a damping ring, an outer periphery of the damping ring is abutted against an inner side wall of the gear box.

In an embodiment, the follow focus comprises a plurality of damping rings, each of two opposite sides of the first worm gear is provided with at least one damping ring.

In an embodiment, the follow focus further includes a wall thickness adjustment member, the wall thickness adjustment member is provided corresponding to the damping ring which is close to the handwheel body, the wall thickness adjustment member is threaded to the active worm gear and is abutted against the damping ring.

In an embodiment, the damping ring is made of rubber; and/or
  the gear box is provided with a lubricant for lubricating the damping ring and an inner side wall of the gear box.

In an embodiment, the follow focus further includes a limit ring assembly, the limit ring assembly includes a damping gasket and two limit ring bodies, and the damping gasket is provided between the two limit ring bodies.

In an embodiment, a mounting groove is provided between the two limit ring bodies, an opening of the mounting groove is provided on an inner surface of the limit ring, and the mounting groove is configured for mounting the damping gasket.

In an embodiment, each of two opposite sides of the two limit ring bodies is provided with a mounting notch, and two mounting notches enclose to form the mounting groove.

In an embodiment, the limit ring assembly further includes a limit seat and two limit screws, the limit seat is provided close to the gear box, the limit seat is provided with a limit blocking plate extending toward the limit ring body and located at a top of the limit ring body, each limit ring body is detachably provided with the limit screw, and the limit screw is fitted with the limit blocking plate.

In an embodiment, the damping gasket is made of polyformaldehyde (POM); and/or
  the limit blocking plate is provided with a mounting hole and a surface of the limit screw is provided with an elastic ring, and the elastic ring is interference fit with the mounting hole; and/or
  the limit ring assembly further includes a gasket ring, an inner surface of each limit ring body is provided with the gasket ring, and an end surface of the limit screw is abutted against the gasket ring.

In the above technical solution of the present application, the follow focus includes the gear box, the handwheel assembly and the follow focus assembly. The handwheel assembly includes a handwheel body and an active worm, the active worm is fixed to the handwheel body and extends toward the gear box, and the active worm is provided with a first worm gear; and a follow focus assembly includes a follow focus gear and a driven worm, the driven worm is fixed to the follow focus gear and extends toward the gear box, the driven worm is provided with a second worm gear, an angle between the active worm and the driven worm is 90°, and the first worm gear is meshed with the second worm gear. In the technical solutions of the present application, the transmission structure between the handwheel body and the follow focus gear is configured as an active worm and the driven worm. It should be noted that the pressure angle of the first worm gear is adapted to the pressure angle of the second worm gear. Because the transmission gap between the first worm gear and the second worm gear is very small, even to be ignored, so that there is no transmission gap between the follow focus gear and the second worm gear, and then to make the follow focus gear to rotate tightly with the handwheel body, that is, to make the rotation angle of the follow focus gear to be consistent with the rotation angle of the handwheel body. The user's feel of driving the handwheel body is increased, to avoid that the follow focus gear cannot focus the focus.

BRIEF DESCRIPTION OF THE DRAWINGS

In order to more clearly illustrate the technical solutions in embodiments of the present application or prior art, the following will briefly introduce the drawings in the embodiments or prior art. Obviously, the drawings in the following description are only some embodiments of the present application. Other drawings can be obtained for those skilled in the art based on the structure illustrated in these drawings without any creative effort.

The realization of the purpose, functional features and advantages of the present application will be combined with the embodiments, with reference to the attached drawings for further explanation.

DETAILED DESCRIPTION OF THE EMBODIMENTS

The following will clearly and completely describe the technical solutions in the embodiments of the present application in conjunction with the drawings. Obviously, the described embodiments are only a part of the embodiments of the present application, and not all of them. Based on the embodiments of the present application, all other embodiments obtained by those skilled in the art without any creative labor fall within the scope of the present application.

It should be noted that all directional indications (such as up, down, left, right, front, back . . . ) in the embodiments of the present application are only used to explain the relative position relationship, movement, etc. among components in a particular posture (as shown in the attached figure), and if the particular posture is changed, the directional indications are changed accordingly.

In the present application, unless otherwise specified and limited, the terms "connection" and "fixation", etc. are understood in a broad sense, for example, "fixation" can be a fixed connection, a removable connection, or an integral part. It can be a mechanical connection, or an electrical connection. It can be directly connected, or indirectly connected through an intermediate medium, can be the internal connection of two components or the interaction between two components, unless otherwise expressly limited. The specific meaning of the above terms in the present application can be understood for those skilled in the art according to the specific situation.

In addition, if there is a description of "first", "second", etc. in the present application embodiment, the description of "first", "second", etc. is used for descriptive purposes only and is not to be understood as indicating or implying its relative importance or implicitly specifying the number of technical features indicated. Thus, features defined with "first" and "second" may explicitly or implicitly include at least one such feature. In addition, "and/or" in the whole text includes three parallel solutions. "A and/or B", for example, includes A, or B, or A and B. In addition, the technical solution of each embodiment can be combined with each other, but it must be based on that those skilled in the art can achieve. When the combination of technical solutions contradicts or cannot be realized, it should be considered that the combination of technical solutions does not exist and is not within the scope of the present application.

The present application proposes a follow focus.

Figure 4:
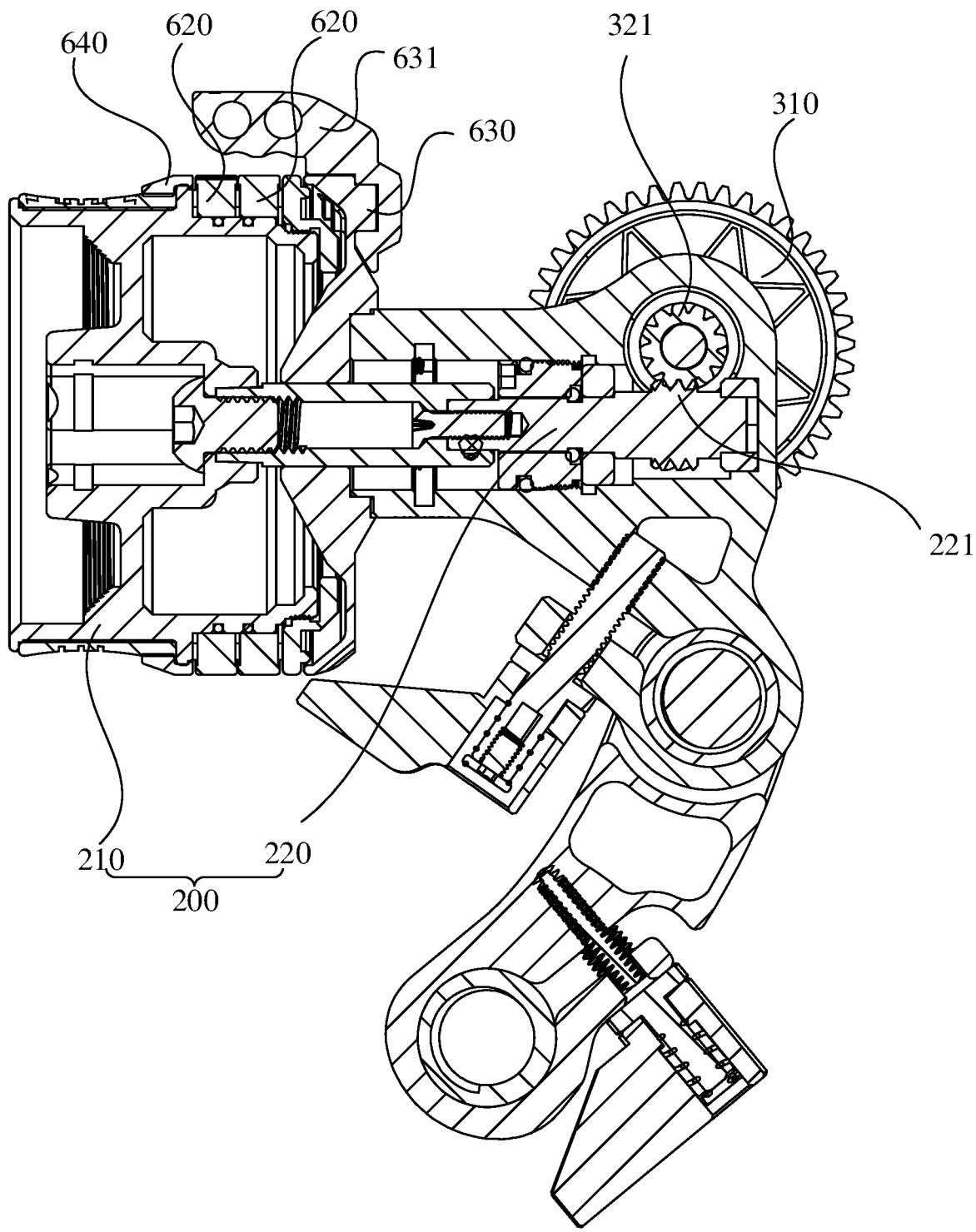
FIG. 4 is a schematic cross-sectional structural view of the follow focus from another perspective.
Figure 5:
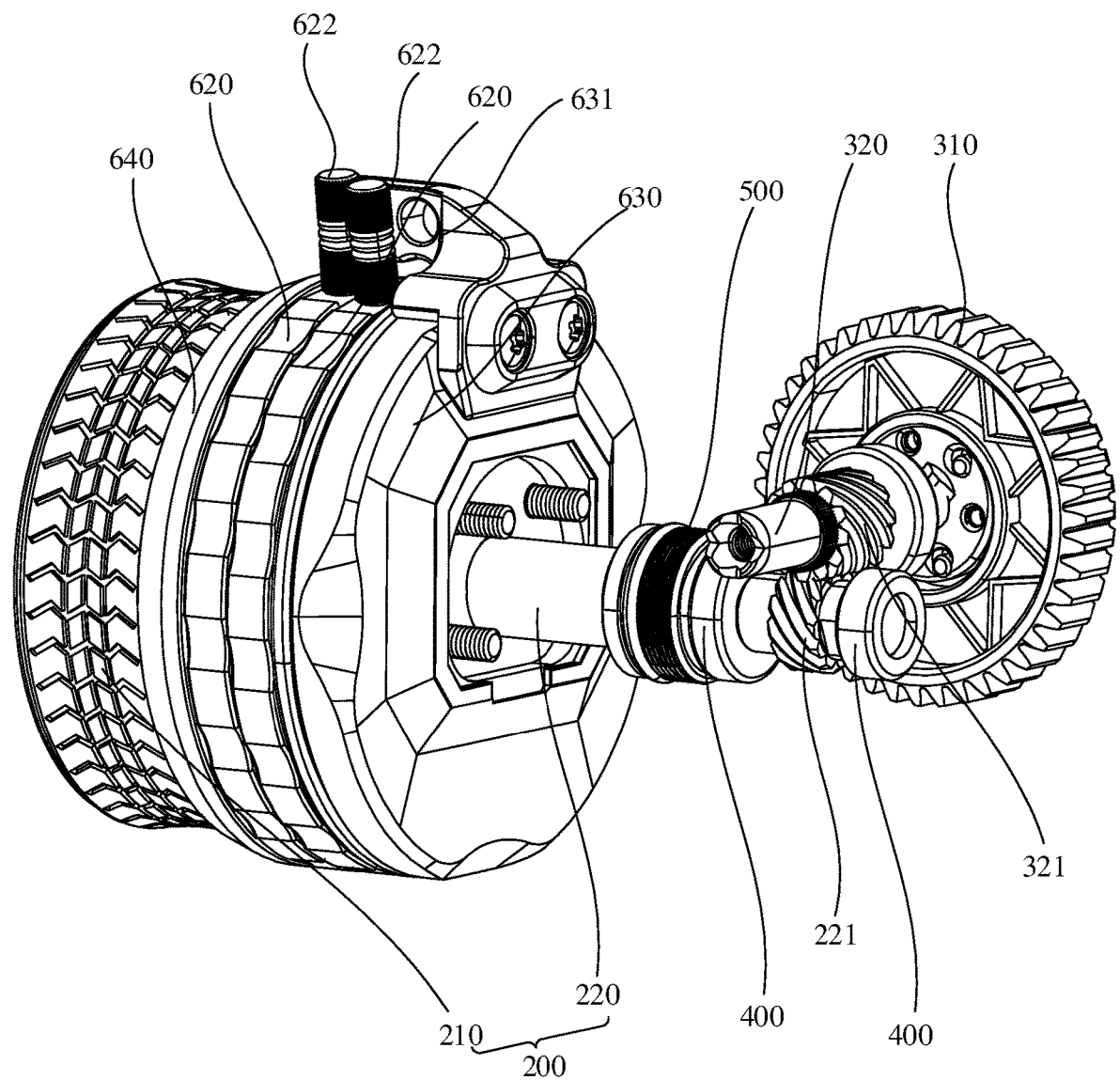
FIG. 5 is a partial structural view of the follow focus.

Referring to FIGS. 4 and 5, in an embodiment of the present application, the follow focus includes a gear box 100, a handwheel assembly 200 and a follow focus assembly 300. The handwheel assembly 200 includes a handwheel body 210 and an active worm 220, the active worm 220 is fixed to the handwheel body 210 and extends toward the gear box 100, the active worm 220 is provided with a first worm gear 221. The follow focus assembly 300 includes a follow focus gear 310 and a driven worm 320, the driven worm 320 is fixed to the follow focus gear 310 and extends toward the gear box 100. The driven worm 320 is provided with a second worm gear 321. An angle between the active worm 220 and the driven worm 320 is 90°, and the first worm gear 221 is meshed with the second worm gear 321.

In the technical solutions of the present application, the transmission structure between the handwheel body 210 and the follow focus gear 310 is configured as the active worm 220 and the driven worm 320. The first worm gear 221 of the active worm 220 is meshed with the second worm gear 321 of the driven worm 320. It should be noted that the pressure angle of the first worm gear 221 is adapted to the pressure angle of the second worm gear 321. Because the transmission gap between the first worm gear 221 and the second worm gear 321 is very small, even to be ignored, so that there is no transmission gap between the follow focus gear 310 and the second worm gear 210, and then to make the follow focus gear 310 to rotate tightly with the handwheel body 210, that is, to make the rotation angle of the follow focus gear 310 to be consistent with the rotation angle of the handwheel body 210. The user's feel of driving the handwheel body 210 is increased, to avoid that the follow focus gear 310 cannot focus the focus.

It can be understood that the damping feel of the handwheel body 210 determines the user's feeling of use, and the uneven damping strength will lead to poor focus, and the zoom effect will not be smooth continuously. The handwheel body 210 of the follow focus in the current market has damping adhesion when rotating, the damping adhesion means that when the handwheel body 210 rotates at the beginning, it needs a larger driving force to be started, and when the handwheel body 210 rotates over adhesion, the driving force needed to drive the handwheel body 210 is less than the driving force at the beginning, but because during the, the user cannot adjust the driving force in time. However, because the user cannot adjust the driving force of the handwheel body 210 in time during the rotation, thus the user continues to use a larger driving force to drive the handwheel body 210 when the handwheel body 210 rotates over adhesion, it is easy to exceed the focal range in the case of a closer focus. Further, due to the presence of damping adhesion, the handwheel body 210 does not rotate easily during the focus fine-tuning, and even the rotation of the handwheel body 210 and the follow focus gear 310 is not felt, the user's feeling is poor.

In an embodiment, the active worm 220 is provided with a damping ring 400, and the outer peripheral surface of the damping ring 400 is abutted against the inner wall of the gear box 100. It can be understood that the outer peripheral surface of the damping ring 400 is abutted against the inner wall of the gear box 100, which can increase the case sealing of the gear box 100 and avoid impurities from entering the gear box 100. Since the outer peripheral surface of the damping ring 400 is abutted against the inner wall of the gear box 100, so that the damping between the damping ring 400 and the inner wall of the gear box 100 exists all the time, therefore, when the handwheel body 210 is turned, the same force can be used to drive the handwheel body 210 all the time, to avoid the user to adjust the driving force of the hand during the rotation of the handwheel body 210, to avoid the adjustment beyond the focal range. Further, since the damping ring 400 and the inner wall of the gear box 100 are always damped, the user can use a predetermined force to drive the handwheel body 210, and the handwheel body 210 can rotate, to drive the follow focus gear 310 to rotate, and thus the user's feeling of the follow focus is improved.

Further, there are a plurality of damping rings 400, at least one damping ring is provided on each of two opposite sides of the first worm gear 221. Thus, the damping on two opposite sides of the first worm gear 221 can be balanced.

In an embodiment, the follow focus also includes a wall thickness adjustment member 500, and the wall thickness adjustment member 500 is provided corresponding to the damping ring 400 which is near the handwheel body 210, and the wall thickness adjustment member 500 is threaded to the active worm 220 and is abutted against the damping ring 400. It can be understood that, due to the error of the production process, the damping between the damping ring 400 and the inner wall of the gear box 100 during installation is different from the predetermined damping between the damping ring 400 and the inner wall of the gear box 100, and the damping of the damping ring 400 and the inner wall of the gear box 100 will affect the driving force of the handwheel body 210. In the embodiment, the wall thickness adjustment member 500 is abutted against the damping ring 400 to make the damping ring 400 to deform and make the wall thickness of the damping ring 400 to change, that is, the damping ring 400 is used to change the damping between the damping ring 400 and the inner wall of the gear box 100, which in turn changes the driving force required to drive the rotation of the handwheel body 210.

Further, the wall thickness adjustment member 500 is threaded to the active worm 220, and the wall thickness adjustment member 500 is screwed toward the damping ring 400, and the wall thickness adjustment member 500 is abutted against the damping ring 400 to deform the damping ring 400, to increase the wall thickness of the damping ring 400.

In an embodiment, the damping ring 400 is made of rubber, because the rubber is not only inexpensive, but also has the advantages of good elastic deformation, wear resistance, cold resistance and not easy to deflate, which not only can reduce the production cost of the follow focus, but also can increase the sealing of the gear box 100. Of course, the present application is not limited to this, in other embodiments, the damping ring 400 can also be made of silicone.

In an embodiment, the gear box 100 is provided with lubricant for lubricating the damping ring 400 and the inner wall of the gear box 100. It can be understood that the lubricant in the gear box 100 makes the damping ring 400 not to be worn out too fast and jam, the lubricant also makes the handwheel body 210 to rotate, the feel of the rotation is more smooth and better.

Figure 2:
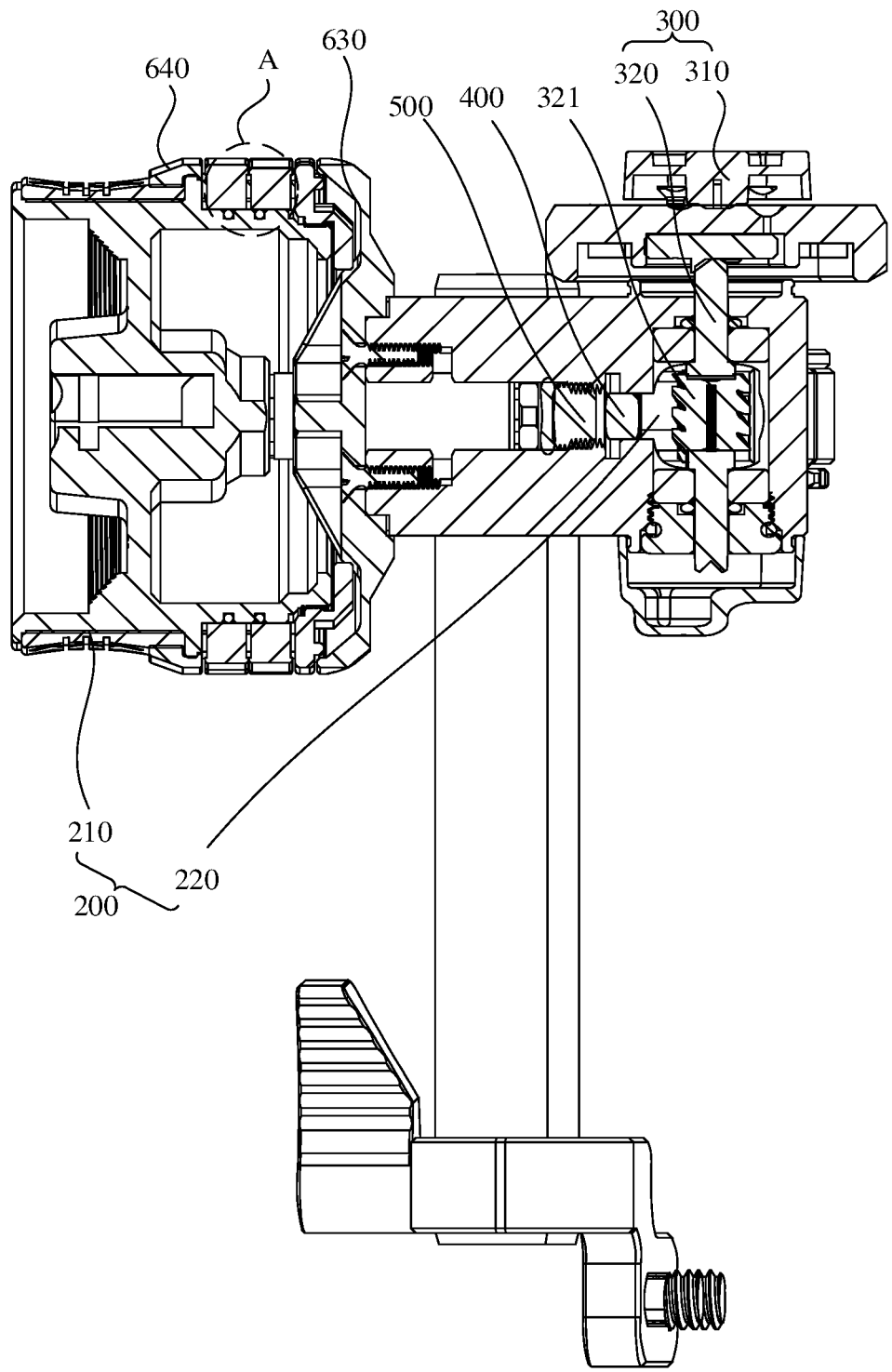
FIG. 2 is a schematic cross-sectional structural view of the follow focus from a perspective.
Figure 3:
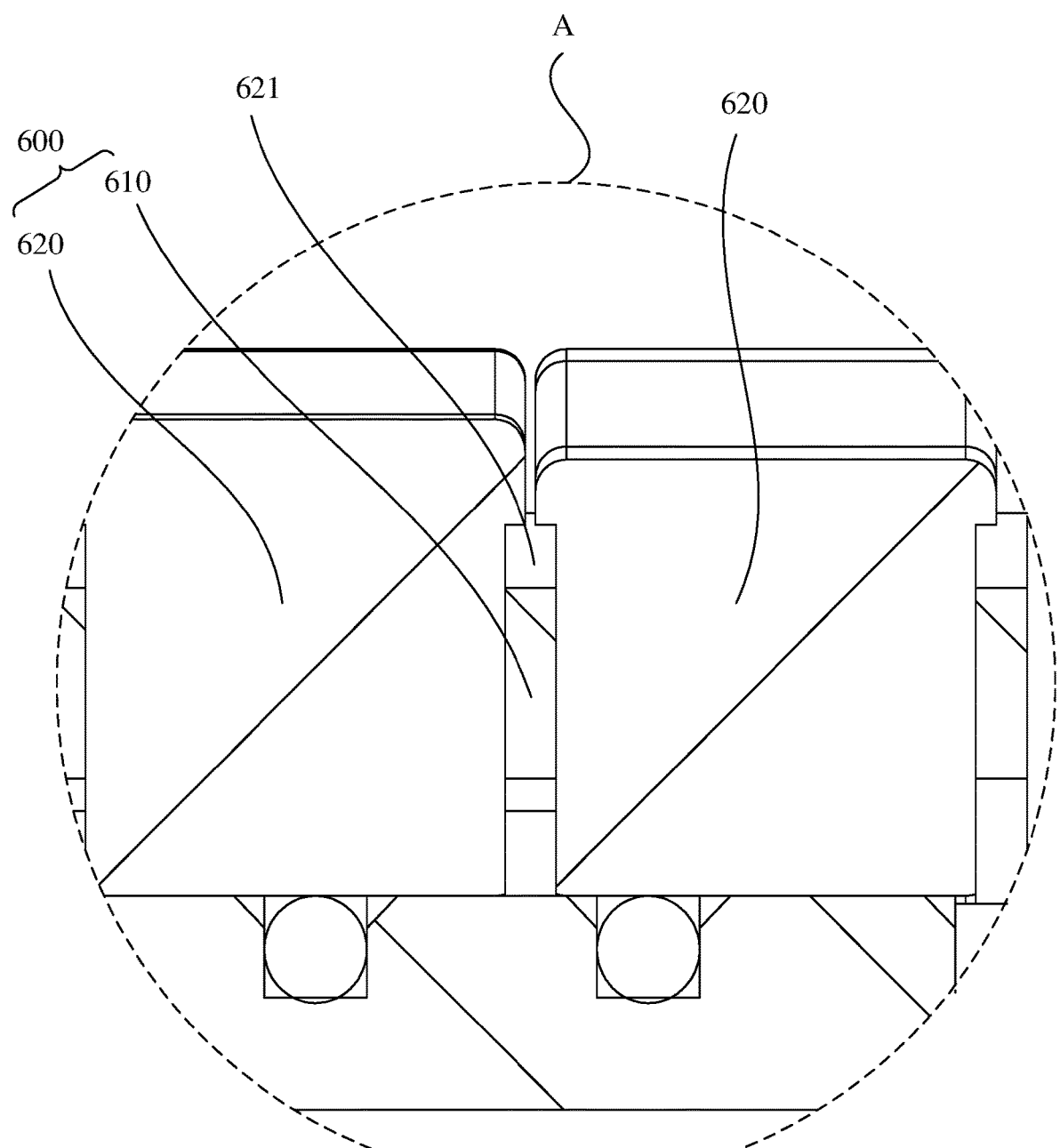
FIG. 3 is a partial enlarged view at A position in FIG. 2.

Referring to FIG. 2 and FIG. 3, in an embodiment, the follow focus also includes a limit ring assembly 600, the limit ring assembly 600 includes a damping gasket 610 and two limit ring bodies 620, the damping gasket 610 is provided between the two limit ring bodies 620, thus a damping effect can be brought when the limit ring is rotated alone, to increase the feel of rotation.

In an embodiment, a mounting groove 621 is provided between the two limit ring bodies 620, and an opening of the mounting groove 621 is provided on the inner surface of the limit ring body 620, and the mounting groove 621 is provided for mounting the damping gasket 610, which is provided to hide the damping gasket 610 and thus increase the aesthetics of the follow focus, and the opening of the mounting groove 621 is provided on the inner surface of the limit ring body 620 to avoid impurities from falling into the mounting groove 621. The opening of the mounting groove 621 is located on the inner surface of the limit ring body 620, to prevent impurities from falling into the mounting groove 621 and eroding the limit ring body 620 and the damping gasket 610, or obstructing the operation of the limit ring body 620 and the damping gasket 610. Of course, the present application is not limited to this, in other embodiments, it is also possible to set the damping gasket 610 directly between the two limit ring bodies 620 without the mounting groove 621.

In an embodiment, each of two opposite sides of the two limit ring bodies 620 is provided with a mounting notch, and the two mounting notches enclose to form the mounting groove 621, so that the two limit ring bodies 620 have the same shape, which is conducive to reducing the cost of mold opening, and thus reducing the production cost of the follow focus. Of course, the present application is not limited to this, in other embodiments, the mounting groove 621 can also be provided on only one limit ring body 620, and a side of the mounting groove 621 facing the other limit ring body 620 is provided with a damping opening.

In an embodiment, the damping gasket 610 is made of polyformaldehyde (POM), because POM has self-lubricating properties, self-lubricating properties during the rotation of the handwheel body 210 will not produce frictional sound, when a limit screw 622 of the limit ring body 620 is loosened, the limit ring body 620 will not randomly rotate to produce a loud sound. Furthermore, POM has good fatigue resistance, wear resistance and impact strength, which is conducive to increasing the service life of the damping gasket 610. Of course, the present application is not limited to this, in other embodiments, the damping shim 610 can also made of nylon.

In an embodiment, the limit ring assembly 600 also includes a gasket ring (not shown), an inner surface of each limit ring body 620 is provided with the gasket ring, and an end surface of the limit screw 622 of the limit ring body 620 is abutted against the gasket ring, so that the limit screw 622 of the limit ring body 620 can avoid abrasion with the inner sheet metal when it is screwed in, so that the gasket ring is provided to increase the service life of the limit screw 622.

Further, the gasket ring is made of silicone, which is due to the advantage of flexibility without deformation and long service life, which can increase the service life of the gasket ring. Of course, the present application is not limited to this, in other embodiments, the gasket ring can also be made of rubber.

Figure 1:
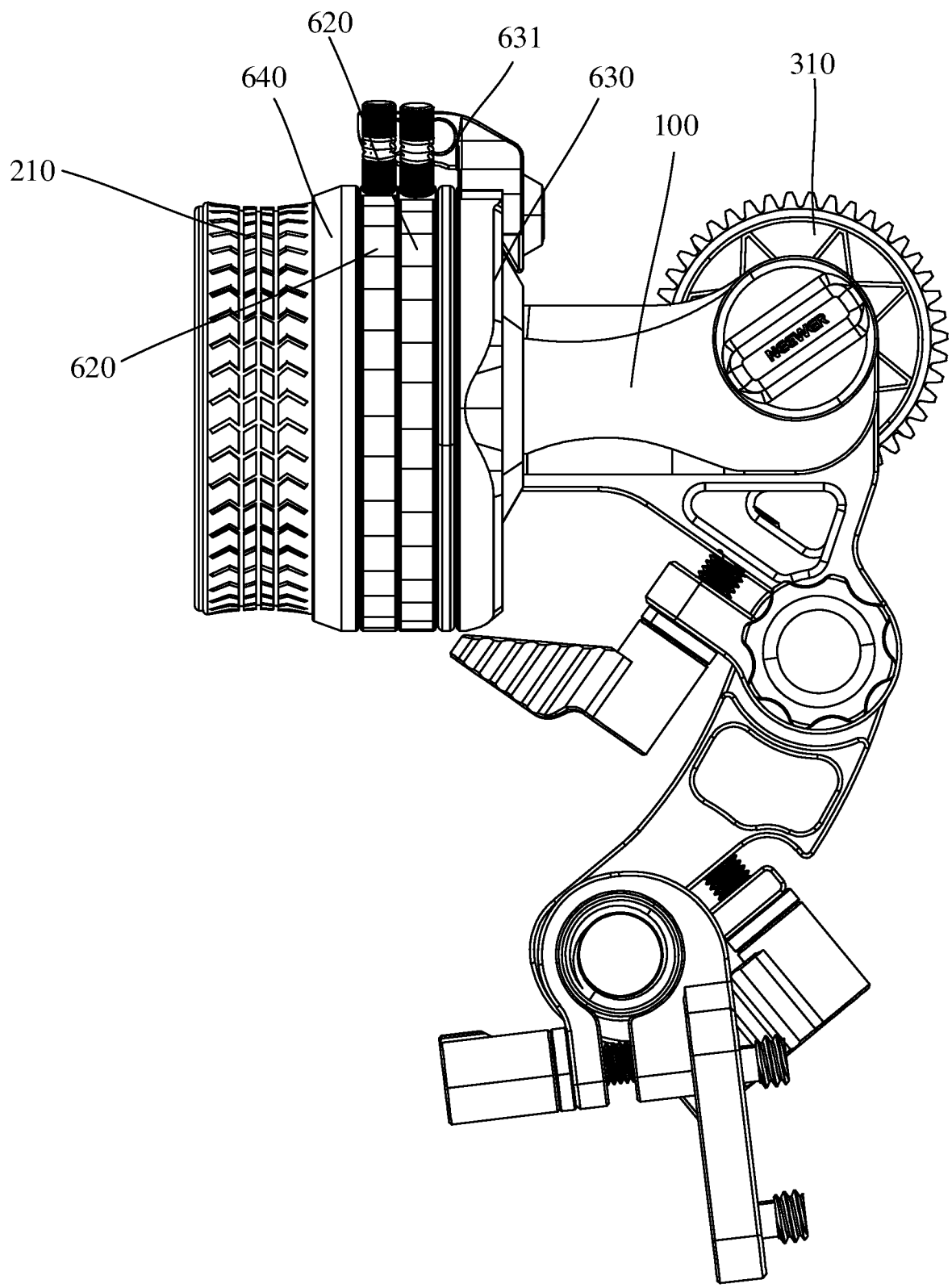
FIG. 1 is a schematic structural view of a follow focus according to some embodiments of the present application.

Referring to FIG. 1, in an embodiment, the follow focus also includes a marker ring 640, the marker ring 640 is provided between the limit ring body 620 and the handwheel body 210, the marker ring 640 is white, so that the marker can be marked with a black marker pen, which can be erased later, and conducive to being used repeatedly.

Further, the limit ring assembly 600 also includes a limit seat 630 and two limit screws 622, the limit seat 630 is close to the gear box 100, the limit seat 630 has a limit blocking plate 631 extending toward the limit ring body 620 and located at the top of the limit ring body 620, each limit ring body 620 is detachably provided with a limit screw 622, the limit screw 622 is fitted with the limit blocking plate. It can be understood that the limit seat 630 is rotatably connected with the handwheel body 210, and the limit seat 630 is provided on the side of the limit ring body 620 away from the handwheel body 210, and the limit screw 622 follows the rotation of the limit ring body 620 and is limited by the limit blocking plate 631, to achieve the purpose of quickly adjusting the focal length of the lens within a fixed range. Furthermore, the limit blocking plate 631 and the marker ring 640 can be used with the circular follow focus ring to achieve multiple interfocal zooms and a long focal length adjustment.

In an embodiment, the limit blocking plate 631 is provided with a mounting hole, and the surface of the limit screw 622 is provided with an elastic ring, and the elastic ring fits into the mounting hole. It can be understood that the limit screw 622 can be removed from the limit ring body 620 and inserted into the mounting hole on the limit blocking plate 631. At this time, the rotation range of the limit ring body 620 is no longer limited by the limit screw 622, and it can be rotated infinitely, so that the lens can be driven to adjust the focal length within the maximum travel range to achieve the function of infinite follow focus. The elastic ring can prevent the limit screw from loosening. Of course, the present application is not limited to this, in other embodiments, the elastic ring can also be set in the mounting hole, the limit screw 622 is interference fit with the elastic ring.

Further, the elastic ring can be a silicone ring or a rubber ring, and there is no restriction on the specific material of the elastic ring here.

The above is only an optional embodiment of the present application, not to limit the scope of the present application. Any equivalent structural transformation made by using the specification and the attached drawings of the present application under the inventive concept of the present application, or direct/indirect application in other related technical fields are included in the scope of the present application.

What is claimed is:

1. A follow focus, comprising:
    a gear box;
    a handwheel assembly comprising a handwheel body and an active worm, wherein the active worm is fixed to the handwheel body and extends toward the gear box, and the active worm is provided with a first worm gear; and
    a follow focus assembly comprising a follow focus gear and a driven worm, wherein the driven worm is fixed to the follow focus gear and extends toward the gear box, the driven worm is provided with a second worm gear, an angle between the active worm and the driven worm is 90°, and the first worm gear is meshed with the second worm gear; and
    the active worm is further provided with a damping ring, and an outer periphery of the damping ring is abutted against an inner side wall of the gear box; and
    the follow focus comprises a plurality of damping rings, and each of two opposite sides of the first worm gear is provided with at least one damping ring.

2. The follow focus according to claim 1, wherein the follow focus further comprises a wall thickness adjustment member, the wall thickness adjustment member is provided corresponding to the damping ring which is close to the handwheel body, and the wall thickness adjustment member is threaded to the active worm gear and is abutted against the damping ring.

3. The follow focus according to claim 1, wherein the damping ring is made of rubber.

4. The follow focus according to claim 1, wherein the gear box is provided with a lubricant for lubricating the damping ring and an inner side wall of the gear box.

5. The follow focus according to claim 1, wherein the follow focus further comprises a limit ring assembly, the limit ring assembly comprises a damping gasket and two limit ring bodies, and the damping gasket is provided between the two limit ring bodies.

6. The follow focus according to claim 5, wherein a mounting groove is provided between the two limit ring bodies, an opening of the mounting groove is provided on an inner surface of the limit ring, and the mounting groove is configured for mounting the damping gasket.

7. The follow focus according to claim 6, wherein each of two opposite sides of the two limit ring bodies is provided with a mounting notch, and two mounting notches enclose to form the mounting groove.

8. The follow focus according to claim 5, wherein the limit ring assembly further comprises a limit seat and two limit screws, the limit seat is provided close to the gear box, the limit seat is provided with a limit blocking plate extending toward the limit ring body and located at a top of the limit ring body, each limit ring body is detachably provided with the limit screw, and the limit screw is fitted with the limit blocking plate.

9. The follow focus according to claim 8, wherein the damping gasket is made of polyformaldehyde (POM).

10. The follow focus according to claim 8, wherein the limit blocking plate is provided with a mounting hole and a surface of the limit screw is provided with an elastic ring, and the elastic ring is interference fit with the mounting hole.

11. The follow focus according to claim 8, wherein the limit ring assembly further comprises a gasket ring, an inner surface of each limit ring body is provided with the gasket ring, and an end surface of the limit screw is abutted against the gasket ring.

* * * * *